(12) United States Patent
Chen

(10) Patent No.: US 8,508,927 B2
(45) Date of Patent: Aug. 13, 2013

(54) GASKET AND DISPLAY ASSEMBLY FOR AN ELECTRONIC MOBILE DEVICE

(75) Inventor: Chao Chen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 295 days.

(21) Appl. No.: 12/889,672

(22) Filed: Sep. 24, 2010

(65) Prior Publication Data

US 2012/0075809 A1   Mar. 29, 2012

(51) Int. Cl.
*H05K 5/00* (2006.01)
*H05K 7/00* (2006.01)
*G06F 1/16* (2006.01)

(52) U.S. Cl.
USPC ............. 361/679.3; 361/679.21; 361/679.26; 361/679.55; 361/679.56

(58) Field of Classification Search
USPC .................... 361/679.26, 679.3, 724, 679.21, 361/679.55, 679.56
See application file for complete search history.

(56) References Cited

U.S. PATENT DOCUMENTS

| | | | |
|---|---|---|---|
| 5,002,368 A | 3/1991 | Anglin | |
| 5,016,987 A | 5/1991 | Smith, Jr. | |
| 5,169,693 A * | 12/1992 | Fujimura | 349/154 |
| 5,332,238 A * | 7/1994 | Borucki | 277/654 |
| 5,479,285 A | 12/1995 | Burke | |
| 5,548,430 A | 8/1996 | Kuo | |
| 5,568,357 A | 10/1996 | Kochis et al. | |
| 5,636,101 A * | 6/1997 | Bonsall et al. | 361/679.27 |
| 5,784,054 A | 7/1998 | Armstrong et al. | |
| 6,064,453 A | 5/2000 | Inubushi et al. | |
| 6,532,152 B1 * | 3/2003 | White et al. | 361/692 |
| 6,545,733 B2 | 4/2003 | Kaga et al. | |
| 6,864,943 B2 | 3/2005 | Hirakata et al. | |
| 6,871,138 B1 * | 3/2005 | Minelli | 701/494 |
| 6,897,852 B2 * | 5/2005 | Grosfeld et al. | 345/173 |
| 7,109,976 B2 | 9/2006 | Cobian | |
| 7,183,948 B2 | 2/2007 | Roberts | |
| 7,267,313 B2 | 9/2007 | Krzoska et al. | |
| 7,301,761 B2 | 11/2007 | Merz et al. | |
| 7,342,573 B2 | 3/2008 | Ryynanen | |
| 7,379,128 B2 | 5/2008 | Tsubokura et al. | |

(Continued)

FOREIGN PATENT DOCUMENTS

| | | |
|---|---|---|
| EP | 1691263 A1 | 8/2006 |
| EP | 1983411 A1 | 10/2008 |
| WO | WO2008030594 A2 | 3/2008 |
| WO | WO2009126480 A2 | 10/2009 |

OTHER PUBLICATIONS

U.S. Appl. No. 12/578,141, Portable Electronic Device and Method of Control, filed Oct. 13, 2009.
U.S. Appl. No. 12/713,884, Keypad Assembly, filed Feb. 26, 2010.

(Continued)

*Primary Examiner* — Anthony Haughton
(74) *Attorney, Agent, or Firm* — Quarles & Brady LLP

(57) ABSTRACT

An electronic mobile device includes a device housing and a spacer supported within the device housing. An outer panel is supported by the spacer, and the outer panel and the spacer together define an internal recess. A display configured to display information is supported by the device housing within the internal recess. A gasket is compressed between the device housing, the spacer, and the outer panel to inhibit debris ingress to the device housing. The gasket has a first side that engages the device housing and a second side that engages the spacer and the outer panel.

19 Claims, 8 Drawing Sheets

(56) References Cited

U.S. PATENT DOCUMENTS

| | | | |
|---|---|---|---|
| 7,436,396 B2 * | 10/2008 | Akieda et al. | 345/173 |
| 7,457,111 B2 | 11/2008 | Merz et al. | |
| 7,464,814 B2 * | 12/2008 | Carnevali | 206/320 |
| 7,697,272 B2 * | 4/2010 | Choi | 361/679.21 |
| 7,907,394 B2 * | 3/2011 | Richardson et al. | 361/679.3 |
| 8,213,168 B2 * | 7/2012 | McClure et al. | 361/679.26 |
| 8,218,306 B2 * | 7/2012 | Lynch et al. | 361/679.3 |
| 8,238,087 B2 * | 8/2012 | McClure et al. | 361/679.26 |
| 2002/0149571 A1 | 10/2002 | Roberts | |
| 2003/0048597 A1 * | 3/2003 | Wang et al. | 361/681 |
| 2003/0184514 A1 * | 10/2003 | Grosfeld et al. | 345/156 |
| 2004/0155991 A1 | 8/2004 | Lowles et al. | |
| 2004/0156168 A1 * | 8/2004 | LeVasseur et al. | 361/681 |
| 2005/0052425 A1 | 3/2005 | Zadesky et al. | |
| 2006/0066769 A1 * | 3/2006 | Minaguchi et al. | 349/58 |
| 2007/0252819 A1 * | 11/2007 | Peters et al. | 345/173 |
| 2008/0055258 A1 | 3/2008 | Sauers | |
| 2008/0280657 A1 | 11/2008 | Maenpaa et al. | |
| 2010/0061055 A1 | 3/2010 | Dabov et al. | |
| 2011/0164370 A1 * | 7/2011 | McClure et al. | 361/679.26 |
| 2011/0164372 A1 * | 7/2011 | McClure et al. | 361/679.26 |
| 2011/0211309 A1 * | 9/2011 | Gandhi | 361/679.26 |
| 2012/0099266 A1 * | 4/2012 | Reber et al. | 361/679.26 |

OTHER PUBLICATIONS

European Patent Office, European Search Report, Application No. EP10179225.7, Feb. 23, 2011.

* cited by examiner

GASKET AND DISPLAY ASSEMBLY FOR AN ELECTRONIC MOBILE DEVICE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

The present disclosure generally relates to an electronic mobile device having a gasket for inhibiting debris ingress to a device housing.

Electronic mobile devices (e.g., cellular phones, pagers, global positioning system (GPS) navigation devices and other satellite navigation devices, smart phones, wireless organizers, wireless personal digital assistants (PDAs), and the like) typically comprise delicate components (e.g., displays, electronic circuits, and the like) that can easily be damaged during everyday use. For example, an electronic mobile device display can be damaged by impact forces transferred through the outer device housing when dropped. As another example, electronic circuits within the device can be rendered inoperable if debris (e.g., dust particles) enters the device through gaps between adjacent components.

For the above reasons, electronic mobile devices typically include one or more gaskets or seals between some adjacent components, such as the device housing and the display assembly. That is, these gaskets transfer impact forces to more rugged components (e.g., support frames within the device) and away from delicate components (e.g., display panels). In addition, the same or additional gaskets inhibit debris ingress that could damage electronic circuits.

Unfortunately, these gaskets, due to their tight positioning between adjacent components, typically make device assembly relatively difficult. For example, it can be difficult to press a display panel into a gasket that extends around the perimeter of the display panel because of the small clearances between the two components. If care is not taken during this step, the display panel could flatten part of the gasket instead of properly connecting to it, thereby partially rendering the gasket ineffective for inhibiting debris ingress. As another example, other methods for connecting a gasket to a display panel, such as co-molding, typically fail because of different material properties of the two components. In particular, display panels typically cannot tolerate the high temperatures used in co-molding operations. For these reasons, electronic mobile devices typically do not include a gasket that contacts a display panel, and debris may thereby enter and accumulate beneath the display panel.

DETAILED DESCRIPTION

According to some embodiments, an electronic mobile device comprises a device housing and a spacer supported within the device housing. An outer panel is supported by the spacer, and the outer panel and the spacer together define an internal recess. A display configured to display information is supported by the device housing within the internal recess. A gasket is compressed between the device housing, the spacer, and the outer panel to inhibit debris ingress to the device housing. The gasket has a first side that engages the device housing and a second side that engages the spacer and the outer panel.

The teachings of the present disclosure relate generally to portable electronic devices, e.g., mobile communication devices such as pagers, cellular phones, global positioning system (GPS) navigation devices and other satellite navigation devices, smart phones, wireless organizers, wireless personal digital assistants (PDA), and tablet computers. The portable electronic devices could be devices without wireless communication capabilities such as PDAs, electronic gaming devices, digital photograph albums or picture frames, digital cameras, or digital video recorders. These examples are intended to be non-limiting. It is also possible that the teachings of the present disclosure could be applied to electronic devices other than handheld electronic devices, e.g., notebook computers.

Figure 1:
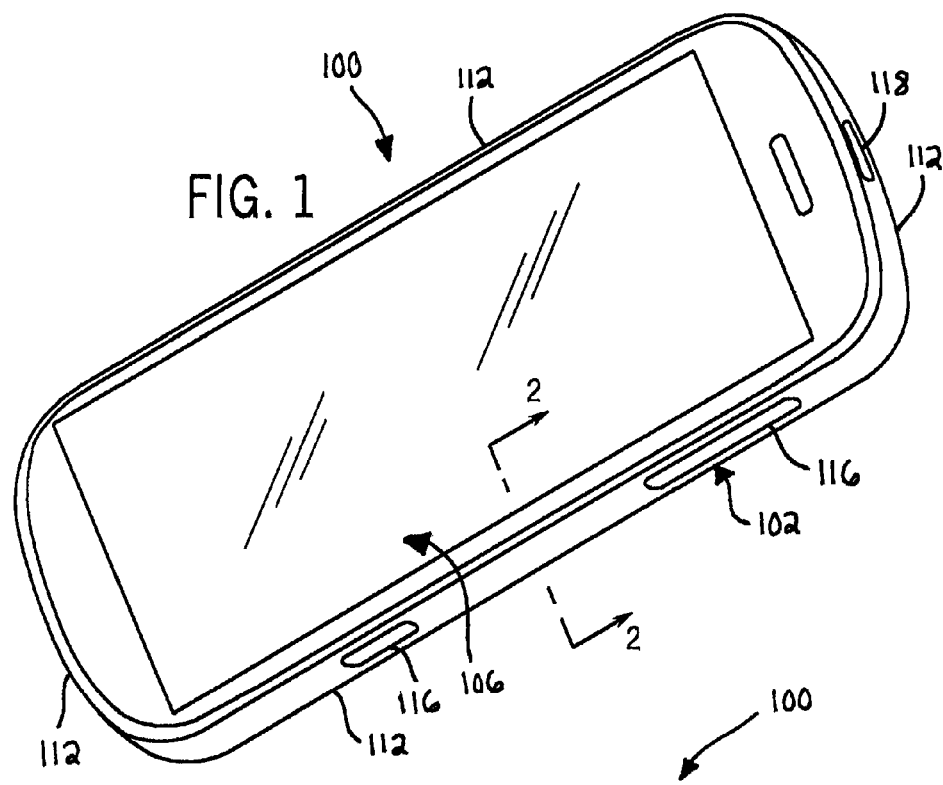
FIG. 1 is a perspective view of an electronic mobile device according to the present disclosure.
Figure 2:
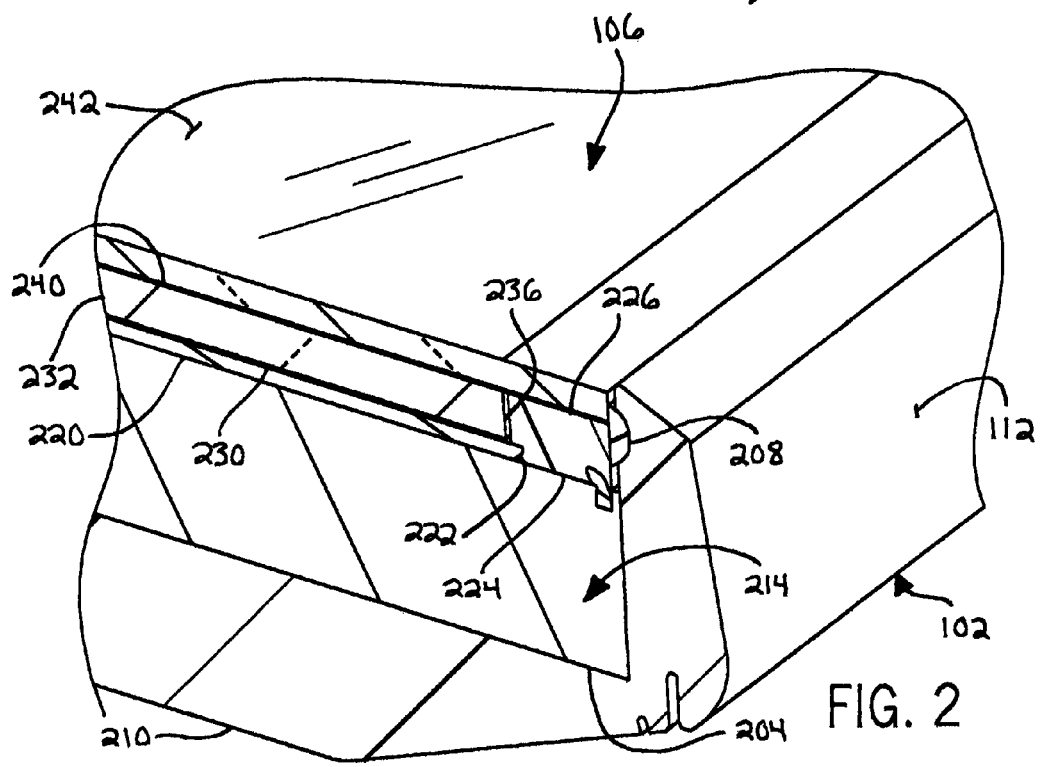
FIG. 2 is a perspective section view of a display assembly and a gasket of the electronic mobile device along line 2-2 of FIG. 1.
Figure 3:
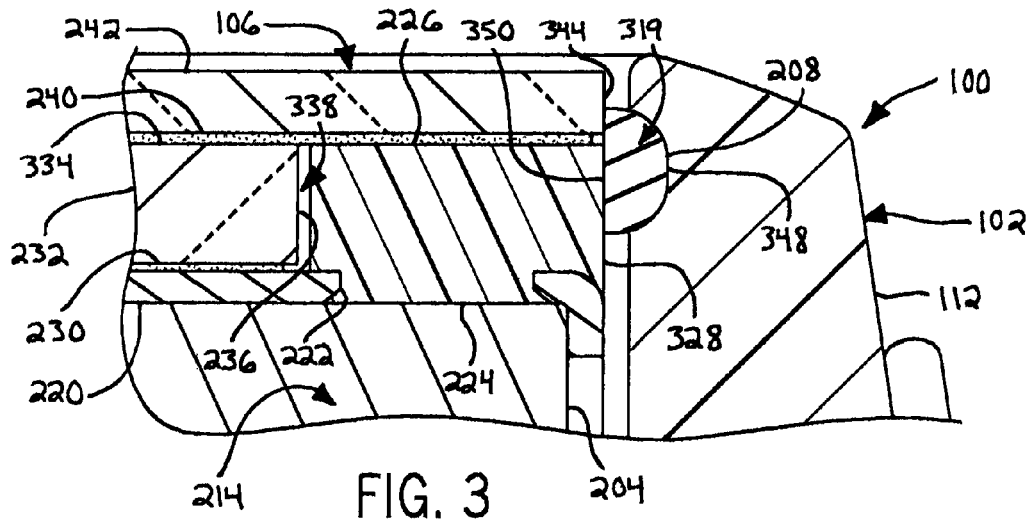
FIG. 3 is a front section view of the display assembly and the gasket along line 2-2 of FIG. 1.
Figure 4:
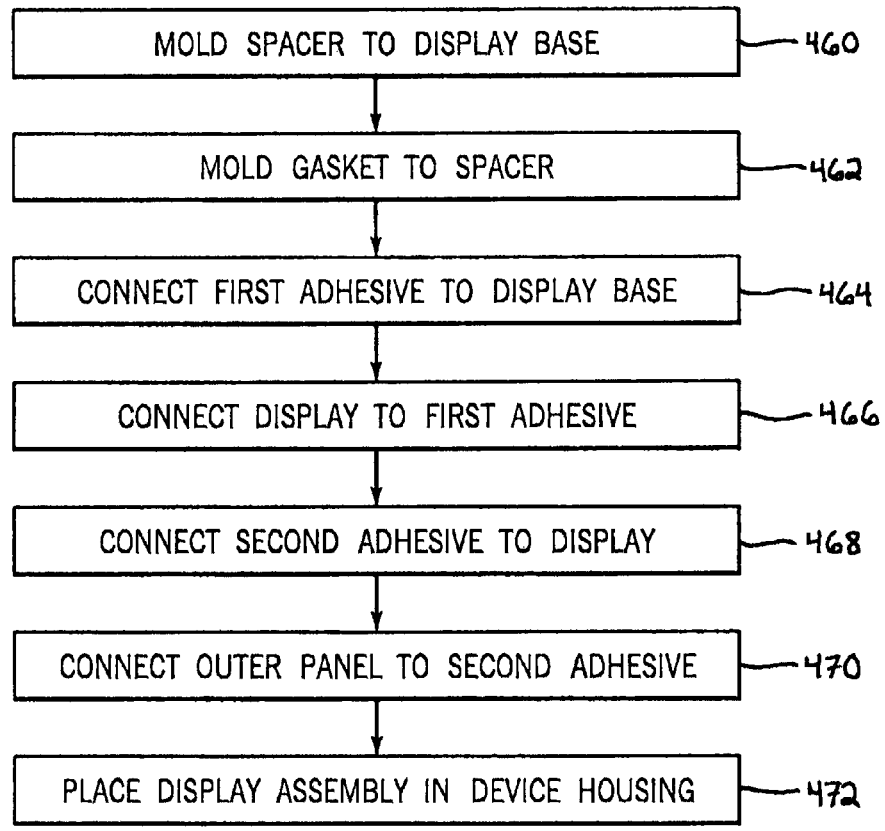
FIG. 4 is a flow chart illustrating a manufacturing process for the electronic mobile device of FIG. 1.

Referring now to FIGS. 1-3, an electronic mobile device 100 according to the present disclosure includes a device housing 102 that supports electronic components 204 (FIG. 2) and a display assembly 106. A seal or gasket 208 is supported between the device housing 102 and the display assembly 106 to prevent debris ingress to the device housing 102. The gasket 208 also transfers impact forces to more rugged components of the display assembly 106 and away from delicate components. Furthermore, the structure of the gasket 208, the display assembly 106, and the device housing 102 facilitate ease of manufacturing and assembly. These aspects and components are described in further detail in the following paragraphs, beginning with the device housing 102 and concluding with the manufacturing process.

Still referring to FIGS. 1-3, the device housing 102 is a generally open-top box shaped component. That is, the device housing 102 includes a back wall 210 (FIG. 2) and a plurality of side walls 112 extending away from the edges of the back wall 210. Together, the back wall 210 and the side walls 112 define a front recess 214 (FIG. 2) in which other components of the device 100 are housed. The side walls 112 also define a gasket channel 319 (FIG. 3) that extends along the inner perimeter of the side walls 112. That is, the gasket channel 319 faces the front recess 214 of the device housing 102.

The back wall 210 and the side walls 112 may also support other components of the device 100, such as buttons 116, power/data ports 118, covers overlaying battery and removable memory compartments (not shown), and the like. In addition, the device housing 102 may comprise various materials, such as metals, polymers, combinations thereof, and the like.

As described briefly above, the front recess 214 of the device housing 102 houses the electronic components 204. In some embodiments, these components include a microprocessor (not shown), communication modules (not shown), and signal transmitters and receivers (not shown). The device housing 102 may also house additional or other electronic components commonly associated with electronic mobile devices 100.

Referring now to FIGS. 2 and 3, the display assembly 106 is housed in the front recess 214 of the device housing 102 and overlays the electronic components 204. In general, the display assembly 106 includes several components, some of which are used to display information and others of which are used to connect and/or protect the components that display information. Immediately above the electronic components 204, the display assembly 106 includes a display base 220. The display base 220 is a generally thin and flat support component that may comprise, for example, metals, polymers, and combinations thereof. The display base 220 includes a plurality of holes, one of which is shown and identified by reference number 222. Each of the holes 222 receives a mounting boss 224 of a spacer 226 that extends proximate the edges of the display base 220.

The spacer 226 generally has a rectangular cross-sectional shape and has an outer perimeter 328 (FIG. 3) disposed proximate each of the side walls 112 of the device housing 102. In addition, the spacer 226 may comprise one or more polymers. The spacer 226 extends about a first adhesive 230 that overlays the display base 220. The first adhesive 230 may be a double-sided adhesive film that adheres to both the display base 220 and a display 232 disposed there above.

The display 232 is a liquid crystal display (LCD), an organic light emitting diode (OLED) display, or the like. In any case, the display 232 has an upper or viewing surface 334 (FIG. 3) on which or through which information, e.g., telephone call information, electronic address book entries, electronic calendar entries, Internet web pages, SMS messages, e-mail messages, navigation directions, electronic planner entries, digital photographs, digital videos, and the like, is viewable.

The display 232 is positioned such that the spacer 226 extends thereabout. However, an outer perimeter 236 of the display 232 is spaced apart from the spacer 226 to define a gap 338 (FIG. 3) there between. As described in further detail below, the gap 338 prevents the spacer 226 from transmitting forces directly to the display 232, thereby inhibiting damaging the display 232 by, e.g., dropping the device 100.

A second adhesive 240 overlays both the viewing surface 334 of the display 232 and the spacer 226. The second adhesive 240 may be transparent to permit viewing of the display 232 there through. Furthermore, the second adhesive 240 may be a double-sided adhesive film that adheres to both the display 232 and an outer panel 242 disposed there above.

The outer panel 242 is generally thin and flat, and in some embodiments, is a transparent component comprising one or more polymers or the like. In some embodiments, the outer panel 242 is a touch-sensitive panel that operates in connection with, e.g., piezoelectric sensors (not shown), capacitive sensors (not shown), or the like in order to act as an input panel for the electronic mobile device 100. In any case, an outer perimeter 344 (FIG. 3) of the outer panel 242 is disposed proximate the side walls 112 of the device housing 102.

Still referring to FIGS. 2 and 3, the gasket 208 is disposed in the gasket channel 319 of the side walls 112 and extends about the outer perimeters of both the spacer 226 and the outer panel 242. The gasket 208 may have a generally rectangular cross-sectional shape with two arcuate corners and may comprise an elastically deformable polymer that is softer than the side walls 112, the spacer 226, and the outer panel 242. This permits the gasket 208 to be compressed between these components. In particular, a first side 348 (FIG. 3) of the gasket 208 engages the side walls 112 within the gasket channel 319, and a second side 350 of the gasket 208 engages the outer perimeters of both the spacer 226 and the outer panel 242. The manner in which the gasket 208 is connected to the spacer 226 (described in further detail below) provides a tight fit between the gasket 208 and the display assembly 106. This fit, in addition to the gasket 208 engaging the side walls 112, provides a seal between the display assembly 106 and the side walls 112. As such, the gasket 208 prevents debris ingress to the device housing 102 between the side walls 112 and the display assembly 106.

Contact forces between the gasket 208 and the spacer 226 are larger than those between the gasket 208 and the outer panel 242 due to the manner in which the display assembly 106 is connected to the device housing 102 (described in further detail below). That is, the gasket 208 presses against the outer panel 242 more loosely than it does against the spacer 226. As a result, the majority of an impact force acting on the device housing 102 (e.g., caused by dropping the device) is transmitted to the spacer 226 or acts to press the gasket 208 more tightly against the spacer 226. This manner of reacting to impact forces inhibits the forces from damaging the outer panel 242.

Considering the contact forces described above, the spacer 226 may engage at least two thirds of the surface area of the second side 350 of the gasket 208 such that the stress caused by the contact forces is relatively low. As a result, the outer panel 242 may engage at most one-third of the surface area of the second side 350.

Figure 5:
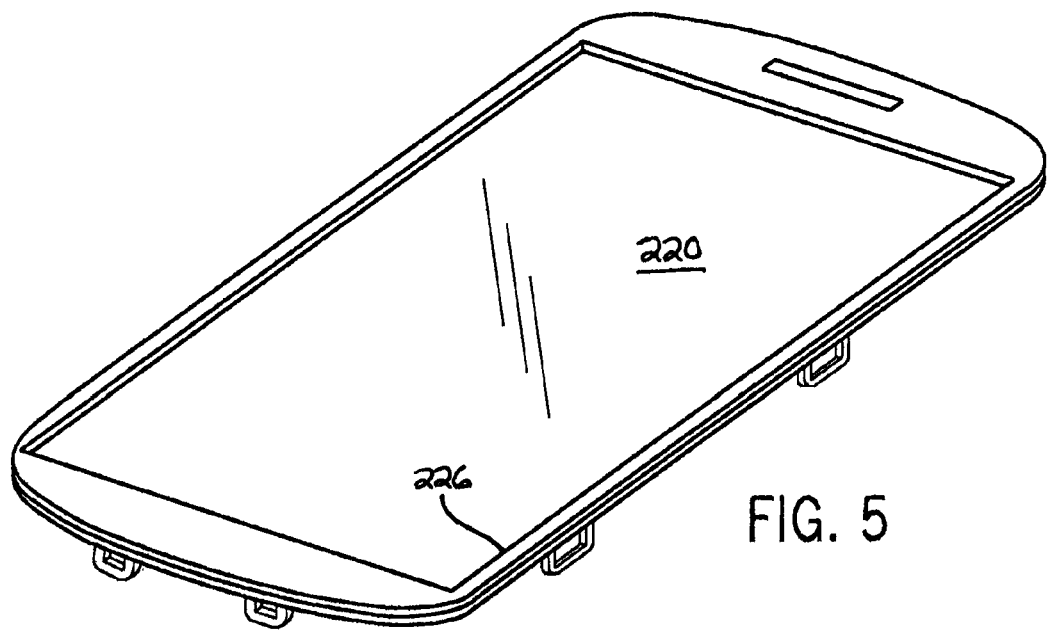
FIG. 5 is a perspective view of a manufacturing subassembly including a spacer of the display assembly connected to a display base.
Figure 6:
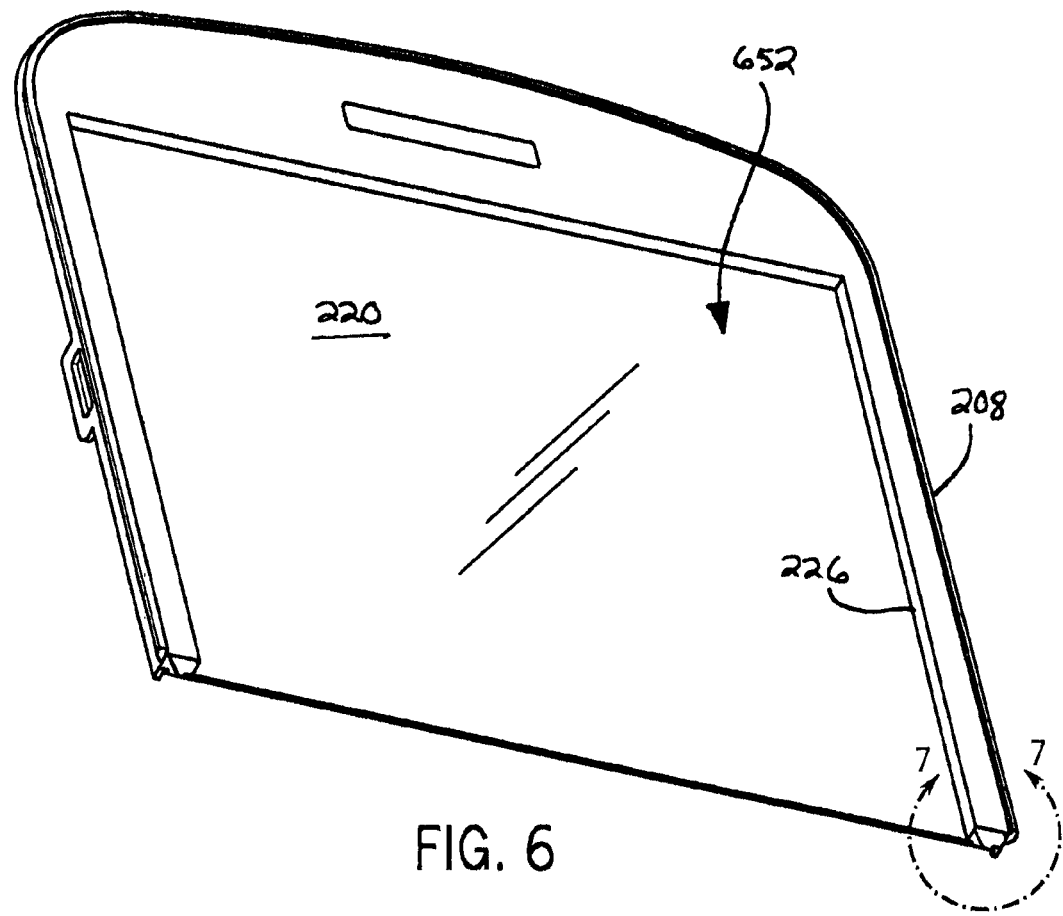
FIG. 6 is a perspective section view of a manufacturing subassembly including the gasket connected to the spacer of FIG. 5.
Figure 7:
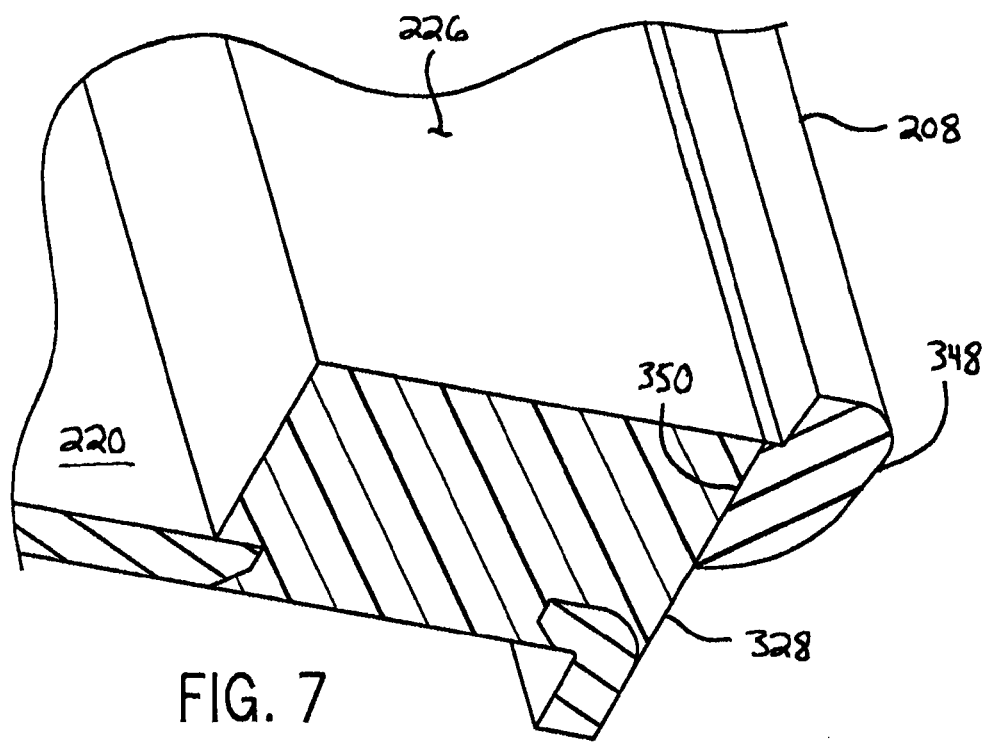
FIG. 7 is a detail perspective view of the subassembly of FIG. 6 enclosed by line 7-7.

Referring now to FIGS. 4-11, a method for manufacturing the electronic mobile device 100, particularly assembling the display assembly 106 and connecting the device housing 102, is preferably as follows. First, at step 460 and as shown in FIG. 5, the spacer 226 is molded to the display base 220 (e.g., in an insert molding operation). As described above, the tapered mounting bosses 224 of the spacer 226 extend through the holes 222 in the display base 220 to secure the spacer 226 to the display base 220. Next, at step 462 and as shown in FIGS. 6 and 7, the gasket 208 is molded to the spacer 226 (e.g., in a co-molding operation) opposite an internal recess 652 defined by the spacer 226 and the display base 220. That is, the gasket 208 is molded along the outer perimeter 328 of the spacer 226.

Figure 11:
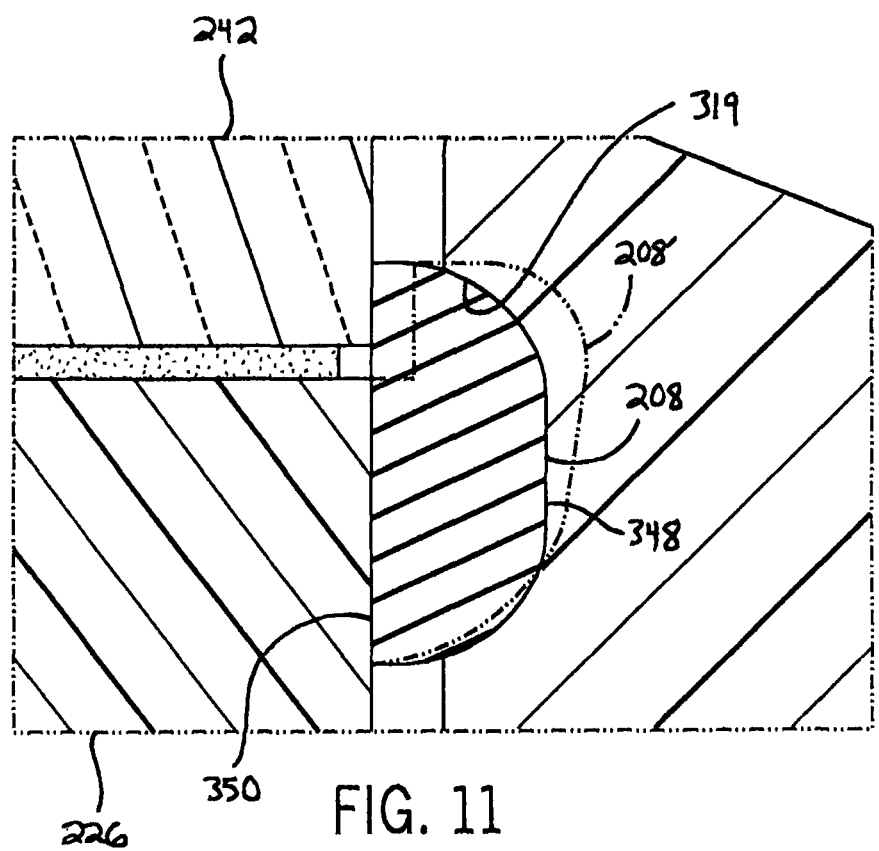
FIG. 11 is a section view illustrating deformation of the gasket due to engagement with the device housing.

As shown most clearly in FIGS. 7 and 11, the gasket 208 is originally formed with a cross-sectional shape 208' (FIG. 11) that differs from that of the completed assembly. Specifically, the area of the second side 350 of the gasket 208 that ultimately contacts the outer panel 242 is originally offset away from the spacer 226 compared to the area of the second side 350 that contacts the spacer 226. Similarly, the area of the first side 348 opposite the offset area of the second side 350 is also offset away from the spacer 226 by a similar distance. The offset may be at least one-sixth of the original width (i.e., the distance between the first side 348 and the second side 350) of the gasket 208 (e.g., about 0.1 to 0.2 mm) to permit the outer panel 242 to be easily placed within the gasket 208 as described in further detail below.

Figure 8:
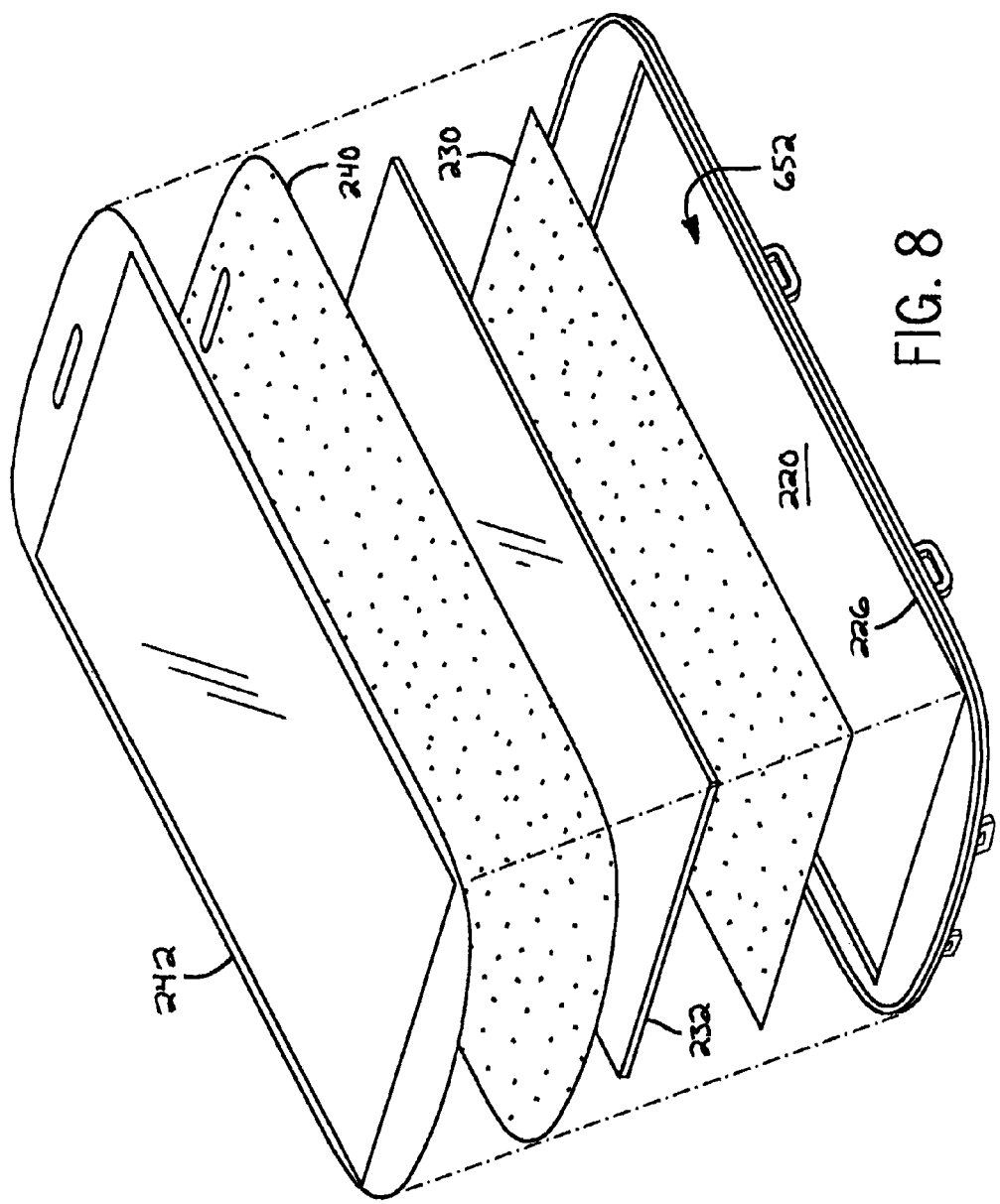
FIG. 8 is an exploded perspective view of a manufacturing subassembly including the subassembly of FIG. 6, adhesives, a display, and an outer panel.

Next, however, and at step 464 and as shown in FIG. 8, the first adhesive 230 is connected to the display base 220 within the internal recess 652. This step may include, e.g., removing a liner (not shown) from the lower surface of the first adhesive 230, pressing the first adhesive 230 against the display base 220, and then removing another liner (not shown) from the upper surface of the first adhesive 230. At step 466 and still referring to FIG. 8, the display 232 is then connected to the first adhesive 230 within the internal recess 652.

Next, at step 468 and as shown in FIG. 8, the second adhesive 240 is overlaid and connects to both the display 232 and the spacer 226. This step may include, e.g., removing a liner (not shown) from the lower surface of the second adhesive 240, pressing the second adhesive 240 against the display 232 and the spacer 226, and then removing another liner (not shown) from the upper surface of the second adhesive 240.

Figure 9:
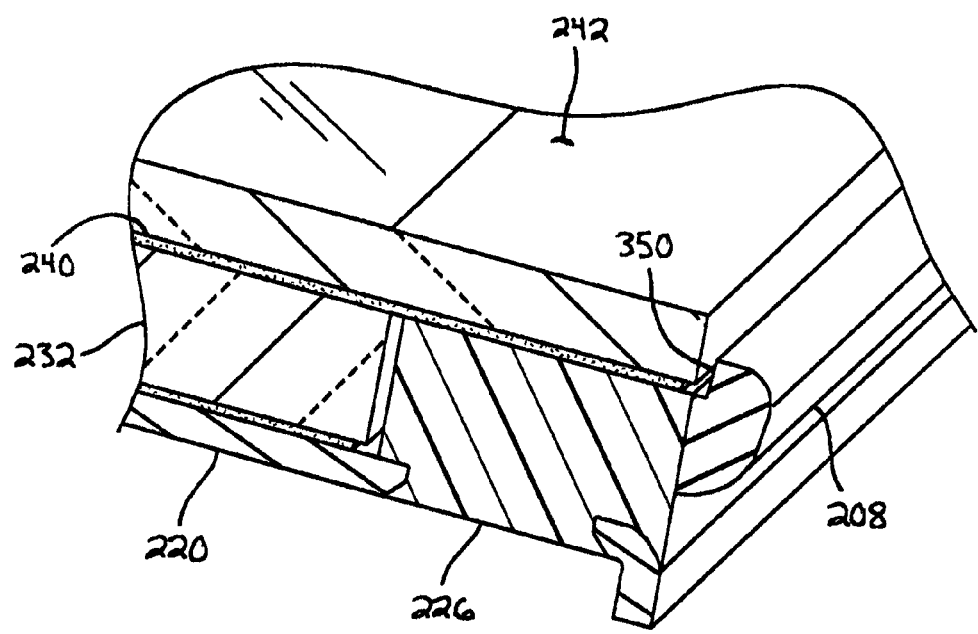
FIG. 9 is a detail section view of the subassembly of FIG. 8.
Figure 10:
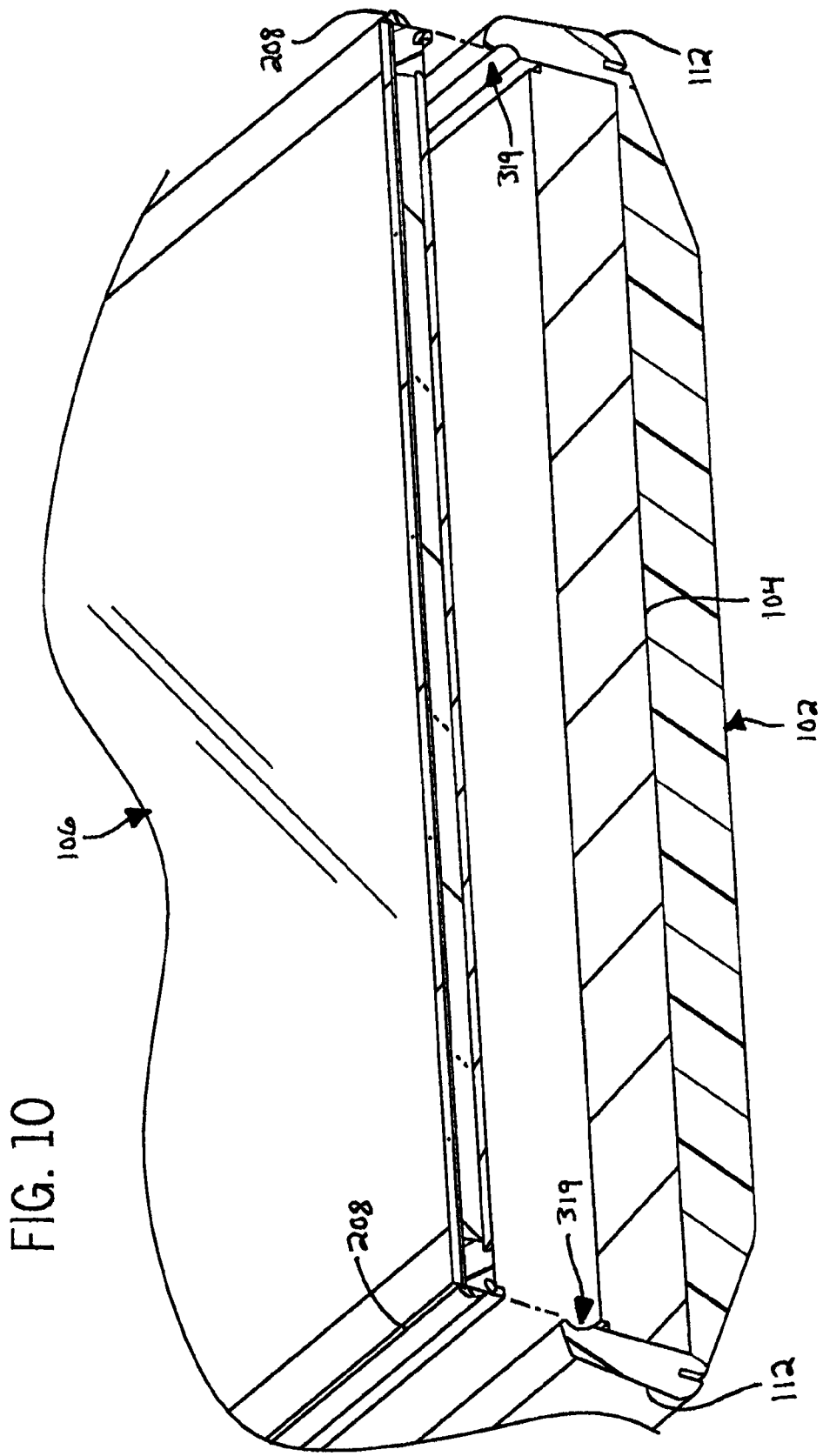
FIG. 10 is an exploded section view of a manufacturing subassembly including the subassembly of FIG. 8 and a device housing.

At step 470 and referring to FIG. 9, the outer panel 242 is then connected to the second adhesive 240. As described briefly above, the second side 350 of the gasket 208 is offset from the outer panel 242 and, as such, the outer panel 242 is easily connected to the second adhesive 240 without displacing or deforming the gasket 208. Lastly, at step 472 and referring to FIG. 10, the display assembly 106 and the gasket 208 are positioned in the device housing 102 such that the gasket 208 is received in the gasket channel 319 of the side walls 112.

As shown in FIG. 11, the cross-sectional area of the gasket channel 319 is less than and differs from the shape of the original cross-sectional area 208' of the gasket. As such, positioning the display assembly 106 and the gasket 208 in the device housing 102 causes the softer gasket 208 to deform and move toward the outer panel 242. The second side 350 of the gasket 208 thereby contacts the outer panel 242 to inhibit debris passage adjacent the outer panel 242.

The electronic mobile device 100 and its method of manufacturing described above may be modified in various manners without departing from the scope of the disclosure. For example, the specific cross-sectional shape of the gasket 208 may differ from that shown in the figures to provide a more circular gasket shape. However, the cross-sectional shape of the gasket 208 shown in the figures (i.e., rectangular with two arcuate corners) allows the arcuate corners of the first side 348 to be slid over the side walls 112 to position the gasket 208 in the gasket channel 319, and the generally flat second side 350 securely engages the spacer 226 and the outer panel 242.

From the above description it should be apparent that the present disclosure provides an electronic mobile device 100 in which a gasket 208 engages an outer display panel 242 to inhibit debris ingress and accumulation beneath the outer panel 242. Moreover, the contact force between the gasket 208 and the outer panel 242 is relatively small compared to that between the gasket 208 and a spacer 226, and therefore the majority of an impact force is transferred to the spacer 226 instead of the outer panel 242. Further still, the present disclosure provides a method for manufacturing the electronic mobile device 100 in a manner that is unlikely to damage components of the display assembly 106.

The various embodiments presented above are merely examples and are in no way meant to limit the scope of this disclosure. Variations of the embodiments described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. An electronic mobile device, comprising:
   a device housing;
   a spacer supported within the device housing;
   an outer panel supported by the spacer, the outer panel and the spacer together defining an internal recess;
   a display configured to display information and being supported by the device housing within the internal recess;
   a gasket compressed between the device housing, the spacer, and the outer panel to inhibit debris ingress to the device housing, the gasket having a first side engaging the device housing and a second side engaging the spacer and the outer panel; and
   wherein the gasket presses against the outer panel more loosely than it does against the spacer, the second side has a surface area, and the spacer engages at least two-thirds of the surface area and the outer panel engages at most one-third of the surface area.

2. The electronic mobile device of claim 1, wherein the spacer and the display define a gap there between to inhibit forces from being transferred from the spacer directly to the display.

3. The electronic mobile device of claim 1, wherein the gasket has a rectangular cross-sectional shape with two arcuate corners.

4. The electronic mobile device of claim 3, wherein the two arcuate corners engage the device housing.

5. The electronic mobile device of claim 1, wherein the gasket comprises an elastically-deformable polymer.

6. The electronic mobile device of claim 1, wherein the gasket is compressed against an outer perimeter of the outer panel.

7. An electronic mobile device, comprising:
   a device housing including:
     a back wall;
     a plurality of side walls adjacent the back wall, the plurality of side walls defining a front recess opposite the back wall;
   a display assembly disposed within the front recess and including:
     a display configured to display information and having an outer perimeter;
     a spacer extending about the outer perimeter;
     an outer panel overlaying the display and the spacer;
   a gasket having a first side abutting the plurality of side walls and a second side abutting the spacer and the outer panel to inhibit debris ingress to the device housing; and
   wherein the gasket presses against the outer panel more loosely than it does against the spacer, the second side has a surface area, and the spacer engages at least two-thirds of the surface area and the outer panel engages at most one-third of the surface area.

8. The electronic mobile device of claim 7, wherein the spacer and the display define a gap there between to inhibit forces from being transferred from the spacer directly to the display.

9. The electronic mobile device of claim 7, wherein the display assembly further comprises a display base supporting the display and the spacer.

10. The electronic mobile device of claim 7, wherein the outer panel is a touch-sensitive panel.

11. The electronic mobile device of claim 7, wherein the plurality of side walls defines a gasket channel in which the first side of the gasket is disposed.

12. A method of manufacturing an electronic mobile device, comprising the steps of:
providing a display base;
connecting a spacer to the display base such that the spacer and the display base together define an internal recess;
positioning a gasket about an outer perimeter of the spacer opposite the internal recess;
positioning a display within the internal recess;
positioning an outer panel proximate the display and the spacer and outside of the internal recess such that an outer perimeter of the outer panel is spaced apart from the gasket; and
deforming the gasket such that the gasket engages the outer perimeter of the outer panel.

13. The method of claim 12, wherein the step of deforming the gasket such that the gasket engages the outer perimeter of the outer panel includes engaging a side of the gasket opposite the outer panel with a plurality of side walls of a device housing.

14. The method of claim 13, wherein the step of engaging the gasket with the plurality of side walls of the device housing includes positioning the gasket within a gasket channel defined by the plurality of side walls.

15. The method of claim 12, wherein the step of positioning the display within the internal recess includes positioning the display such that an outer perimeter of the display is spaced apart from the spacer.

16. The method of claim 12, wherein the step of connecting the gasket about the outer perimeter of the spacer includes co-molding the gasket to the spacer.

17. The method of claim 12, wherein the step of connecting the spacer to the display base includes insert molding the spacer to the display base.

18. The method of claim 12, further comprising the step of connecting a first adhesive to the display base within the internal recess, and wherein the step of positioning the display within the internal recess includes connecting the display to the first adhesive opposite the display base.

19. The method of claim 18, further comprising the step of connecting a second adhesive to the display opposite the display base, and wherein the step of positioning the outer panel proximate the display includes connecting the outer panel to the second adhesive opposite the display.

\* \* \* \* \*